US010208817B2

United States Patent
Netecke et al.

(10) Patent No.: US 10,208,817 B2
(45) Date of Patent: Feb. 19, 2019

(54) DRAWWORKS GEARBOX WITH REDUNDANT BRAKING ON INPUT SIDE

(71) Applicant: Cameron International Corporation, Houston, TX (US)

(72) Inventors: Michael R. Netecke, Houston, TX (US); Rogelio Cabrera, Houston, TX (US)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 15/289,561

(22) Filed: Oct. 10, 2016

(65) Prior Publication Data

US 2018/0100554 A1    Apr. 12, 2018

(51) Int. Cl.
| | |
|---|---|
| *B66D 5/14* | (2006.01) |
| *F16D 55/22* | (2006.01) |
| *F16D 55/225* | (2006.01) |
| *E21B 19/00* | (2006.01) |
| *F16D 65/12* | (2006.01) |
| *F16H 57/025* | (2012.01) |
| *F16H 57/02* | (2012.01) |

(52) U.S. Cl.
CPC ............ *F16D 55/225* (2013.01); *B66D 5/14* (2013.01); *E21B 19/008* (2013.01); *F16D 65/128* (2013.01); *F16H 57/025* (2013.01); *F16H 2057/02069* (2013.01)

(58) Field of Classification Search
CPC .... F16D 55/225; F16D 65/128; F16D 57/025; F16D 2057/02069; F16D 55/46; E21B 19/008; B66D 5/14; B66D 5/26; B66D 55/46
USPC ........................................................ 254/378
See application file for complete search history.

(56) References Cited

U.S. PATENT DOCUMENTS

| | | | | | |
|---|---|---|---|---|---|
| 2,071,107 | A * | 2/1937 | Blatt | ...... | F16D 55/46 188/71.6 |
| 3,247,934 | A * | 4/1966 | Goode | ...... | F16D 65/78 188/264 A |
| 3,964,692 | A * | 6/1976 | Pendleton | ...... | B66D 5/14 254/379 |
| 4,175,727 | A * | 11/1979 | Clarke | ...... | B66D 5/26 192/12 R |
| 4,177,973 | A * | 12/1979 | Miller | ...... | B66D 1/54 188/170 |
| 4,183,649 | A * | 1/1980 | Hartley | ...... | E21B 19/02 254/266 |
| 4,328,954 | A * | 5/1982 | Logus | ...... | B66D 1/44 192/18 A |
| 4,390,161 | A * | 6/1983 | Nelson | ...... | B66D 5/14 188/134 |
| 4,461,460 | A * | 7/1984 | Telford | ...... | B66D 1/22 188/337 |

(Continued)

*Primary Examiner* — Michael E Gallion
(74) *Attorney, Agent, or Firm* — Helene Raybaud

(57) ABSTRACT

A drawworks gearbox includes additional braking on the input side of the gearbox to provide a redundant emergency brake and, optionally, a separate parking brake with the drum-side brakes being the emergency brake. An air-cooled brake disc is attached to a high speed coupling connected to the gearbox input pinion. A hydraulic-apply, spring-release brake is mounted to the gearbox housing at each pinion location and arranged to act on its respective disc.

6 Claims, 4 Drawing Sheets

(56) References Cited

U.S. PATENT DOCUMENTS

| | | | | |
|---|---|---|---|---|
| 4,545,567 A * | 10/1985 | Telford | B66D 5/20 188/337 |
| 4,627,519 A * | 12/1986 | Larsen | B60T 8/52 188/1.11 R |
| 4,696,377 A * | 9/1987 | Richardson | B66D 5/14 188/151 R |
| 5,425,435 A * | 6/1995 | Gregory | B66D 5/14 188/264 A |
| 5,482,255 A * | 1/1996 | Daschel | B66D 5/12 254/378 |
| 5,573,091 A * | 11/1996 | Hung | B66D 1/16 192/12 D |
| 5,944,150 A * | 8/1999 | Hikari | B66D 5/14 188/156 |
| 6,092,789 A * | 7/2000 | Christopher | B66D 1/54 188/106 P |
| 6,182,945 B1 * | 2/2001 | Dyer | B66D 1/54 254/340 |
| 7,178,788 B1 * | 2/2007 | Flud | E21B 19/008 254/337 |
| 7,533,868 B2 * | 5/2009 | Cholinski | B66B 11/043 187/254 |
| 7,644,784 B1 * | 1/2010 | Flud | B63B 35/4413 175/5 |
| 7,866,633 B2 * | 1/2011 | Weiss | B66B 5/04 254/275 |
| 8,272,151 B2 * | 9/2012 | Ries | E02F 3/48 37/395 |
| 2006/0163548 A1 * | 7/2006 | Kochan | A63J 1/028 254/278 |
| 2008/0116432 A1 * | 5/2008 | Folk | B66D 1/12 254/362 |
| 2011/0174540 A1 * | 7/2011 | Ferrari | E21B 19/008 175/27 |
| 2014/0090931 A1 * | 4/2014 | Piech | B66D 5/14 187/250 |
| 2014/0284108 A1 * | 9/2014 | Pendleton | E21B 19/008 175/57 |
| 2015/0014613 A1 * | 1/2015 | Horndacher | B66D 1/40 254/267 |
| 2017/0297876 A1 * | 10/2017 | Holck | E21B 19/09 |

* cited by examiner

DRAWWORKS GEARBOX WITH REDUNDANT BRAKING ON INPUT SIDE

BACKGROUND

This invention relates to parking and emergency braking systems applied to drawworks like those used in oil and gas well drilling rig applications.

Drawworks raise or lower traveling equipment and drill strings by reeling in or paying out a cable connected to the drill string's block-and-tackle connection device, typically a travelling block or hook block. The cable has one end fixed to the rig and the other end fixed to the drawworks drum. A drive system (no clutch) turns the drum and AC motors—a component of the drive system—dynamically (regeneratively) brake the drum as the cable is paid out. When static load holding is desired, the brake system stops the drum to hold the drill string at a fixed position.

The drawworks parking/emergency braking system is also designed to function as a limited duty non-cyclical dynamic brake (emergency) when the primary braking system is not functional, in the event of an AC power interruption or other situation whereby power is removed from the drive motors.

Prior art drawworks may use the motor that drives the drum as the primary brake. On the drum itself is a drum-side braking system that acts as both an emergency brake and parking brake. This braking system typically includes two brake discs, one at each side of the drum, and with at least one caliper with brake pads acting on each disc.

SUMMARY

Preferred embodiments of a drawworks gearbox include additional braking on the input side of the gearbox to provide a redundant emergency brake and, optionally, a separate parking brake with the drum-side brakes being the failsafe emergency (non-cyclical, limited duty, dynamic) brake. In a preferred embodiment, an air-cooled brake disc is attached to the high speed motor coupling connected to each gearbox input pinion. A hydraulic-apply, spring-release brake is mounted to the gearbox housing at each pinion location to act on the air-cooled brake discs.

These input-side brakes serve as the parking brake, with the drum-side brakes serving as the emergency brake. Preferably, the input-side brakes have a 200% capacity, meaning the brakes can support the rated load of the drawworks completely independent of the motor when the motor is braking or when the drum-side braking system is braking.

In another preferred embodiment, the input-side brakes provide a secondary failsafe emergency brake in addition to the drum-side brakes or as a "last chance" emergency brake.

ELEMENTS AND NUMBERING USED IN THE DRAWINGS AND DETAILED DESCRIPTION

Figure 1:
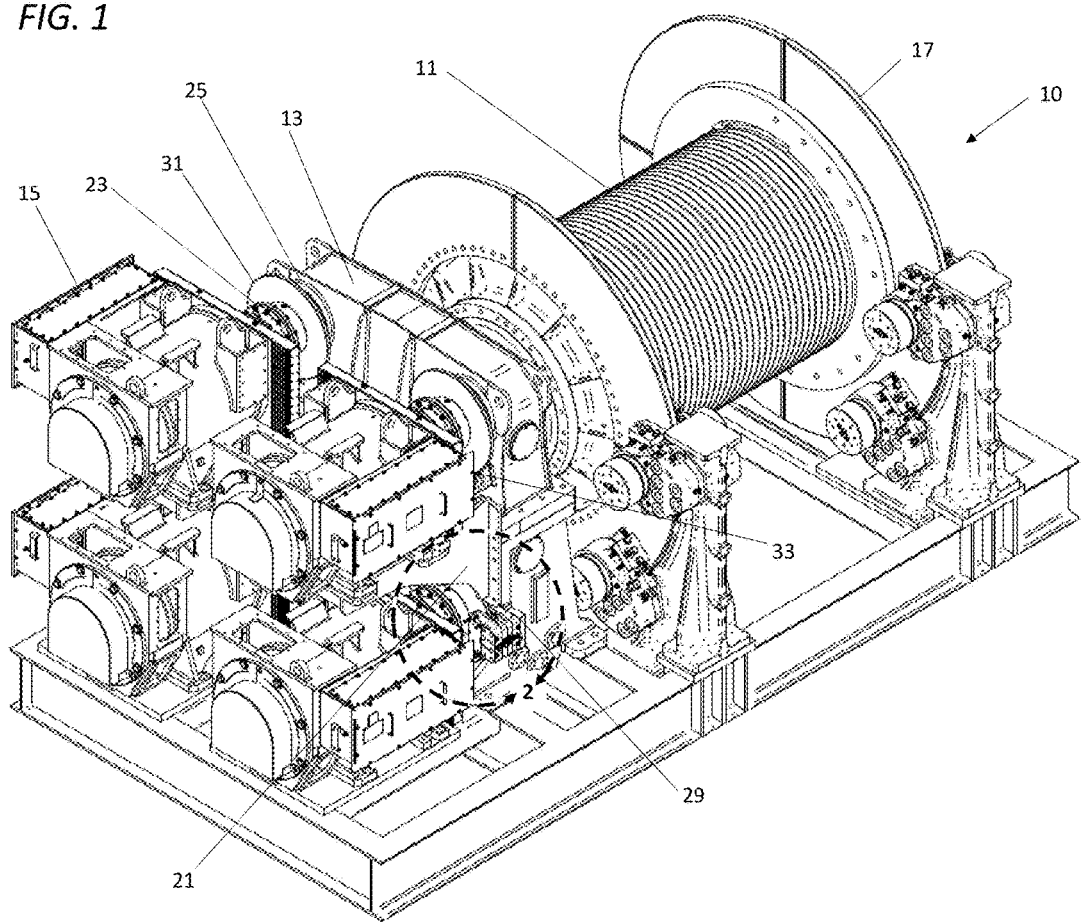
FIG. 1 is an isometric view of a preferred embodiment of a drawworks gearbox with a braking system on the input side of the gearbox.
Figure 2:
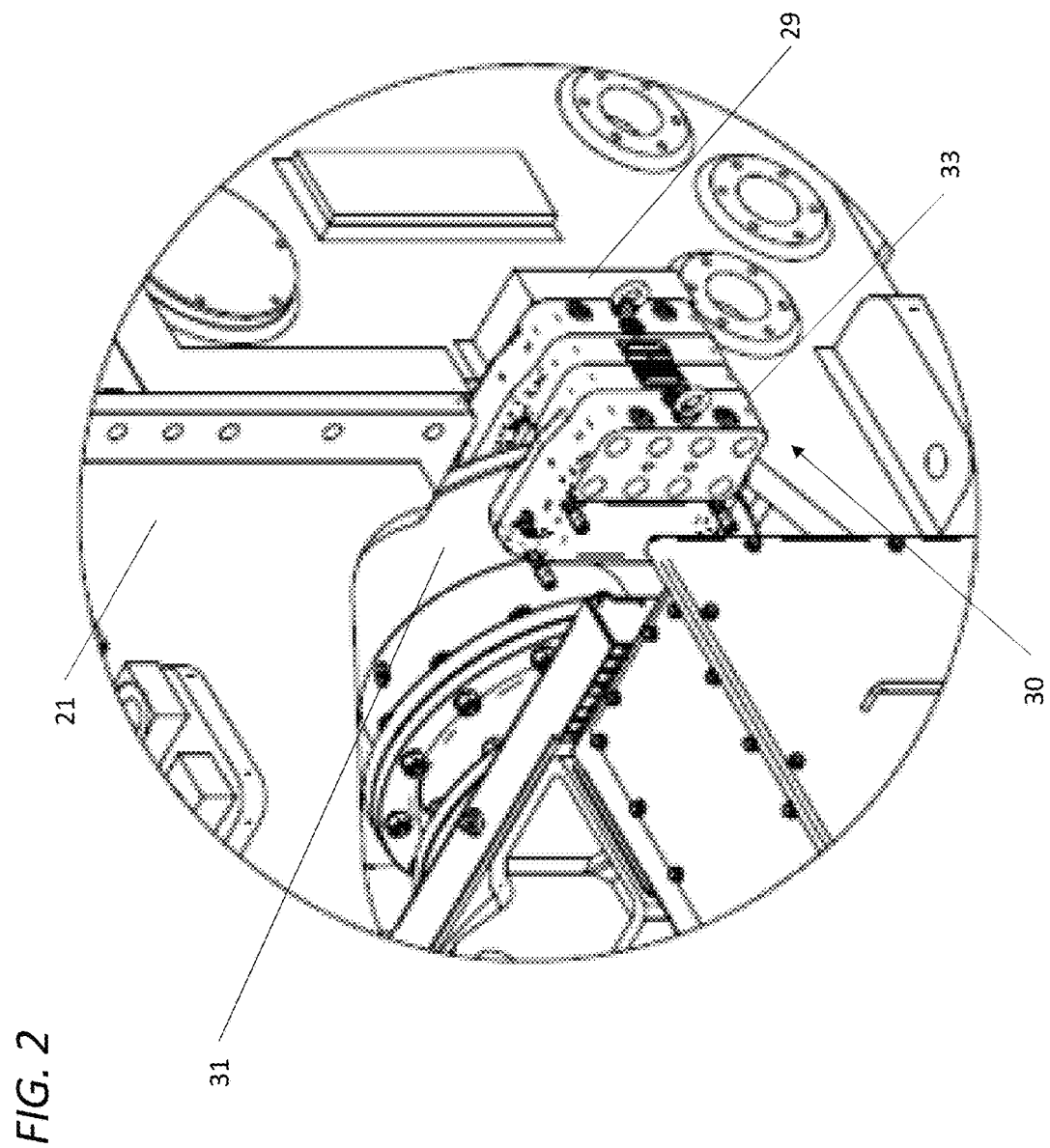
FIG. 2 is an enlarged view of a preferred embodiment of the hydraulic-apply, spring-release brake of FIG. 1 taken along section circle 2 of FIG. 1.
Figure 4:
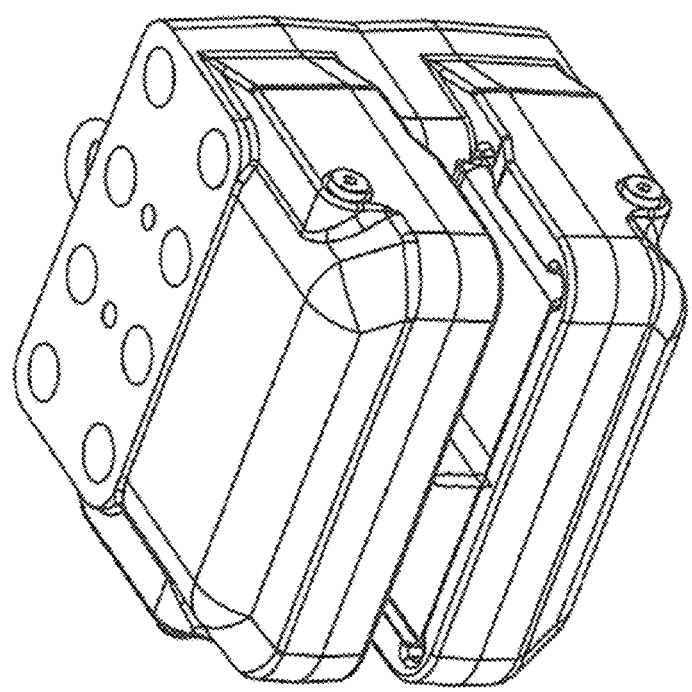
FIG. 4 is another isometric view of the brake of FIG. 2.
Figure 3:
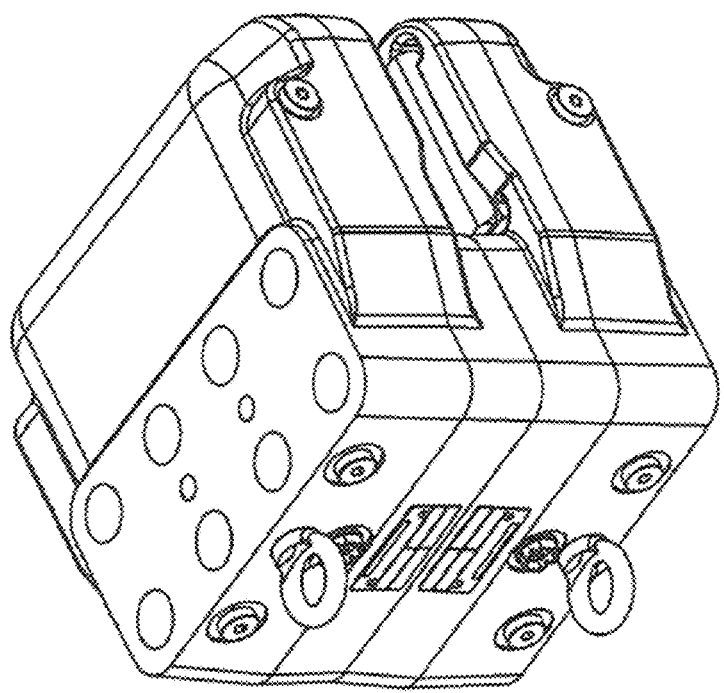
FIG. 3 is an isometric view of the brake of FIG. 2.
Figure 5:
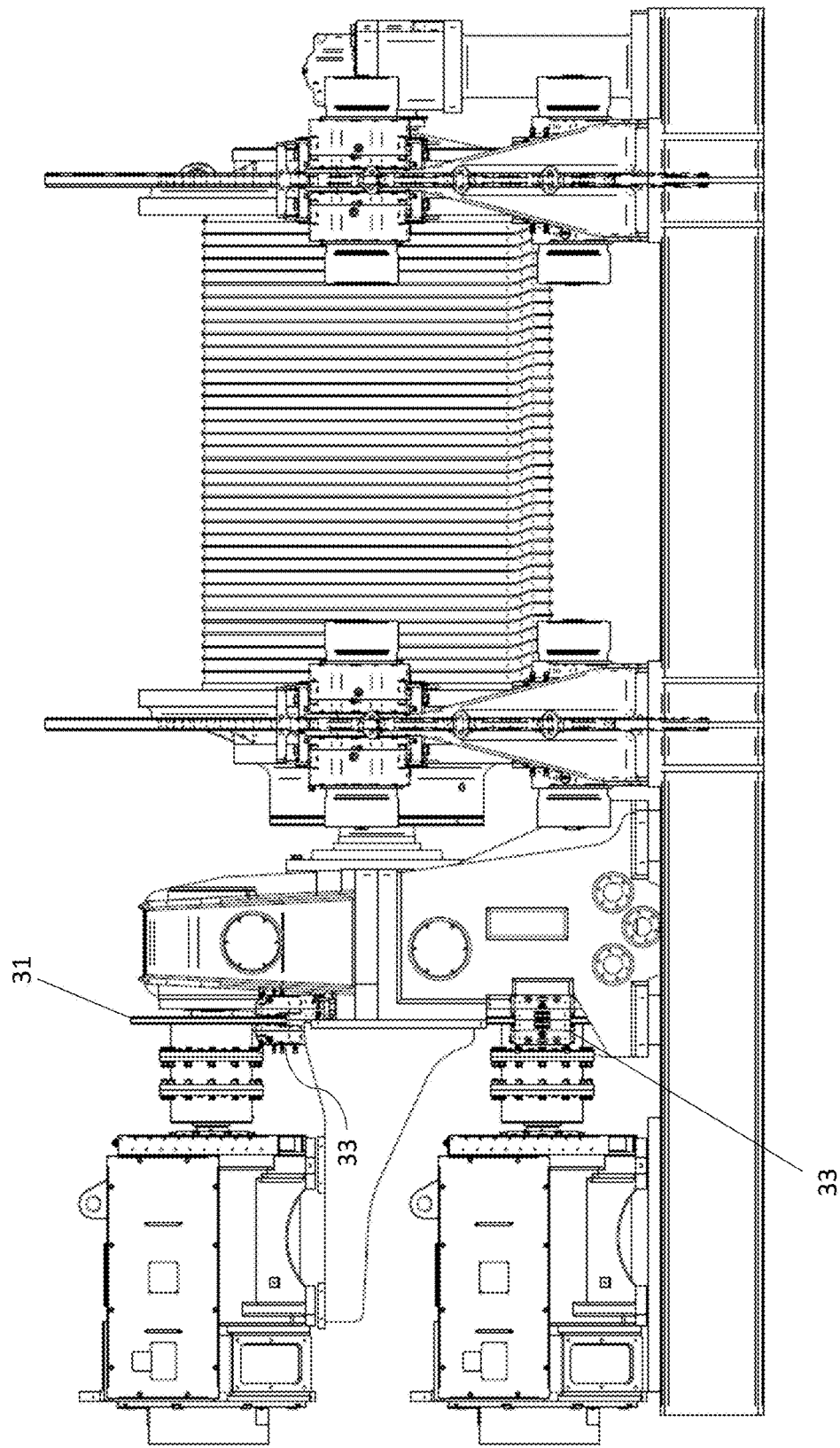
FIG. 5 is a front elevation view of FIG. 1.

10 Drawworks
11 Drum
13 Gearbox
15 Motor
17 Brake disc
19 Drum side brake (spring applied, hydraulic release)
21 Input side of 13
23 High speed coupler
25 Input pinion
27 Housing
29 Flange
30 Additional or redundant braking system
31 Air-cooled brake disc
33 Gearbox input side brake (hydraulic applied, spring release)

DETAILED DESCRIPTION OF THE PREFERRED EMBODIMENTS

Referring to the drawings, a drawworks 10 is made up of a drum 11 connected to a gearbox 13 and motor 15. On each side of the drum 11 is a brake disc 17 acted upon by a brake 19 such as a caliper with brake pads. The discs 17 and their brakes 19 act as the emergency and parking brake, with the motor 15 providing the primary brake.

Located on the input side 21 of the gearbox 13 is a preferred embodiment of an additional or redundant braking system 30. An air-cooled brake disc 31 is attached to a high speed coupling 23 connected to the gearbox input pinion 25. A hydraulic-apply, spring-release brake 33 is mounted to the gearbox housing 27 at a pinion 25 location. For example, a pad or flange 29 can serve as the mounting point for the brake 33 on the gearbox 13, with the brake 33 arranged to act on its respective disc 31. The braking system 30 may be integrated into the drawworks control system (not shown), including an automatic brake monitoring system of a kind known in the art.

Preferably, there is one set of brakes 30 at each pinion 25 location. The input-side brakes 30 preferably have a 200% capacity, meaning that when used together the brakes 30 can support the rated load of the drawworks completely independent of the motor 15 or drum-side braking system 17, 19. A BSAB 90 DUAL-ACTION™ brake (Svendborg Brakes ApS) or its equivalent is a suitable brake 33.

The preferred embodiments described here provide examples of a drawworks gearbox with redundant braking on the input side of the gearbox. The following claims define the scope of the invention and include the full range of equivalents to the recited elements.

What is claimed:

1. A drawworks brake system comprising:
   at least one set of emergency and parking brakes located on each side of a drawworks drum,
      the at least one set of emergency and parking brakes including a brake disc acted upon by a drum brake;
   at least one set of redundant brakes located on an input side of a drawworks gearbox, the at least one set of redundant brakes including:
      an air-cooled disc attached to a high speed coupling connected to an input pinion of the drawworks gearbox;
      a brake mounted to a housing of the drawworks gearbox and arranged to engage the air-cooled disc.

2. A drawworks brake system according to claim 1 wherein the at least one set of redundant brake is a hydraulic-apply, spring-release brake.

3. A drawworks brake system according to claim 1 wherein the at least one set of redundant brakes is deployed as an emergency brake.

4. A drawworks brake system according to claim 1 wherein the at least one set of redundant brakes is deployed as a parking brake.

5. A drawworks brake system according to claim 1, wherein the at least one set of emergency and parking brakes is a failsafe emergency brake.

6. A drawworks brake system according to claim 1, wherein the drum brake comprises a non-cyclical, limited duty, dynamic brake.

\* \* \* \* \*